Figure 1:
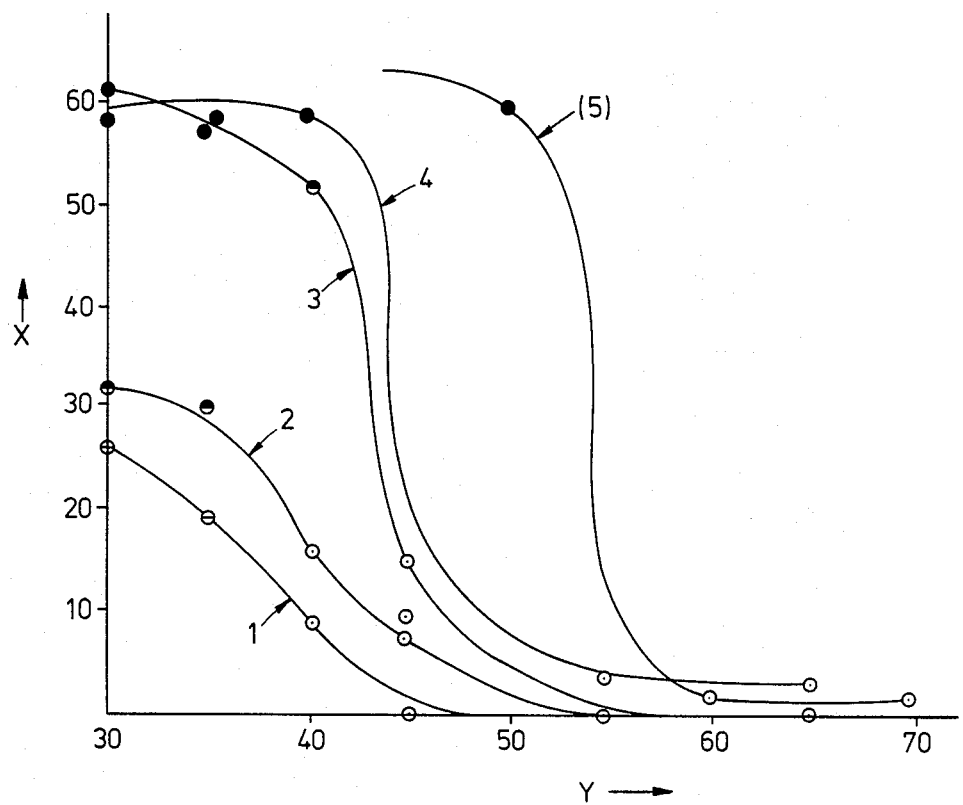

United States Patent [19]

Yardley

[11] Patent Number: 4,537,825

[45] Date of Patent: Aug. 27, 1985

[54] BONDED COMPOSITES OF A THERMOPLASTIC ELASTOMERIC BLEND WITH A VULCANIZED EPOM OR EPM RUBBER COMPOSITION

[75] Inventor: James F. Yardley, Barton Under Needwood, United Kingdom

[73] Assignee: Dunlop Limited, London, England

[21] Appl. No.: 542,711

[22] Filed: Oct. 17, 1983

[30] Foreign Application Priority Data

Oct. 27, 1982 [GB] United Kingdom ............... 8230704

[51] Int. Cl.$^3$ ............... B32B 25/08; C08L 23/02; B29H 9/00; C09J 3/12
[52] U.S. Cl. ............... 428/327; 428/516; 428/517; 428/519; 428/483; 428/910; 428/422; 156/331.1; 264/241
[58] Field of Search ............... 428/517, 327, 519, 516

[56] References Cited

U.S. PATENT DOCUMENTS 3,904,470  9/1975  Fukuki et al. ............... 156/306

FOREIGN PATENT DOCUMENTS 0144157  11/1980  Japan ............... 428/517
1382826  2/1975  United Kingdom .
2041949  9/1980  United Kingdom .

*Primary Examiner*—Patricia C. Ives
*Attorney, Agent, or Firm*—Stevens, Davis, Miller & Mosher

[57] ABSTRACT

A method of making a novel bonded composite of
(i) a thermoplastic elastomeric blend of vulcanized EPDM particles not more than 50 microns in size disposed in a thermoplastic linear crystalline polyolefin continuous phase, with
(ii) a vulcanized EPDM or EPM rubber composition containing less than 50% (preferably 5% to less than 40% by volume of rubber, comprises fusing the thermoplastic elastomeric blend and solidifying it in contact with the vulcanized rubber composition in the absence of an adhesive interlayer. Preferably the blend is extruded onto the vulcanized rubber composition. Preferably the linear crystalline polyolefin in the thermoplastic blend has a melt flow index of at least 0.25 when measured according to the test conditions ASTM D 1238-65T and is selected from polypropylene, propylene copolymers, high density polyethylene and high density ethylene copolymers.

2 Claims, 2 Drawing Figures

BONDED COMPOSITES OF A THERMOPLASTIC ELASTOMERIC BLEND WITH A VULCANIZED EPOM OR EPM RUBBER COMPOSITION

This invention relates to a method of producing a bonded composite of a thermoplastic elastomeric blend with a vulcanized EPDM or EPM rubber composition and to the composite produced thereby.

Thermoplastic elastomeric blends of thermoplastic linear crystalline polyolefin and vulcanized EPDM (ethylene/propylene/diene monomer terpolymer) rubber are known e.g. see those described in U.K. Pat. No. 2,007,683B. In such blends the polyolefin resin is the continuous phase with the EPDM as dispersed particles of a size 50 microns or less, usually 1 to 10 microns. Because the polyolefin is the continuous phase the resulting composition would be expected to behave in a similar way to a composition consisting essentially of the polyolefin alone. However, we have found this not to be the case when trying to bond such a composition to a vulcanized EPDM or EPM (ethylene/propylene copolmer) rubber without the aid of an adhesive interlayer. Only by selecting a particular class of EPDM or EPM rubber compositions, i.e. those compositions containing unexpectedly low levels of EPDM or EPM, can satisfactory adhesion be achieved.

According to one aspect of the present invention a method of making a bonded composite of (i) a thermoplastic elastomeric blend of vulcanized EPDM particles not more than 50 microns in size dispersed in a thermoplastic linear crystalline polyolefin continuous phase, with (ii) a vulcanized EPDM or EPM rubber composition containing less than 50% by volume of rubber, comprises fusing the thermoplastic elastomeric blend and solidifying it in contact with the vulcanized rubber composition in the absence of an adhesive interlayer.

According to a further aspect of the present invention a bonded thermoplastic elastomeric blend/vulcanized EPDM or EPM rubber composite comprises:
  (i) a thermoplastic elastomer which has vulcanized EPDM particles not more than 50 microns in size dispersed in a thermoplastic linear crystalline polyolefin continuous phase, bonded without an adhesive interlayer to
  (ii) a vulcanized EPDM or EPM rubber containing less than 50% by volume of rubber.

By "thermoplastic elastomeric" is meant a macromolecular material which (i) at room temperature is capable of recovering substantially in shape and size after removal of a deforming force and (ii) is capable of being repeatedly softened by increase of temperature and hardened by decrease of temperature i.e. the change upon heating is substantially physical.

The thermoplastic elastomeric blend remains thermoplastic after bonding and no detectable vulcanization takes place during bonding the EPDM particles being already substantially fully vulcanized. The linear crystalline polyolefin in the blend is preferably selected from homopolymers and copolymers of propylene and high density homopolymers and copolymers of ethylene. Linear high density ethylene polymers and linear low density ethylene polymers can be made by low pressure solution polymerization; branched low density ethylene polymers are high pressure solution polymerized and are excluded from the present invention. Preferably the polyolefin has a melt flow index of at least 0.25 when measured according to the test conditions specified in ASTM D 1238-65T.

The EPDM or EPM rubber is usually in nonparticulate form and must be in the vulcanized state (i.e. cross-linked non-thermoplastic) prior to contact with the thermoplastic blend. The EPDM and/or EPM rubber may be in combination with at least one other rubber, preferably such that the total volume of EPDM and/or EPM rubber is more than 50% of the total rubber present.

Examples of methods of bringing the components into contact are by injection, transfer, rotational or compression moulding or extrusion of the thermoplastic elastomeric blend into contact with the vulcanized EPDM or EPM. Preferably the thermoplastic blend is extruded onto the vulcanized EPDM or EPM rubber as extrusion usually achieves a greater degree of "wetting" of the rubber by the thermoplastic. A person of ordinary skill in the art would be able by simple trial and error to adjust the conditions of contact of the two materials in order to achieve satisfactory bonding levels. Where the process involves vulcanizing the EPDM/EPM composition immediately prior to contact with the thermoplastic blend, there is no need to cool the rubber, and indeed it may be advantageous not to do so. If desired an EPDM/EPM composition which has been vulcanized and cooled beforehand can be preheated to promote bonding with a thermoplastic blend.

Preferred compositions of the thermoplastic blend comprise (a) 15 to 45, more preferably 15 to 40, % by volume polyolefin, (b) 15 to 50, more preferably 20 to 45, % by volume EPDM, (c) 15 to 50, more preferably 15 to 45, % by volume oil, and (d) a 15% maximum, more preferably 10% maximum by volume of other ingredient(s).

Preferably the total rubber content of the vulcanized EPDM or EPM rubber composition is less than 40% and at least 5% by volume, more preferably from 5 to 35% by volume. A total rubber content of from 5 to 35% by volume is particularly applicable where the thermoplastic blend to be bonded to it has a Shore D hardness of less than 82.5 or contains less than 35% by volume of linear crystalline polyolefin. The remainder of the composition includes ingredients selected from filler (e.g. carbon black), liquid extender (e.g. petroleum based oil or similar), vulcanizing agent, vulcanization accelerator and antioxidant. Where the thermoplastic blend contains less than 35% by volume polyolefin and more than 34% by volume oil, the rubber content of the rubber composition should be less than 40% by volume in order for satisfactory adhesion to be attained.

The process of the present invention could be used where coextrusion is not practical. For example when making door or window sealing strips an EPDM/EPM rubber composition could be vulcanized in the required profile and then a thermoplastic blend extruded onto it.

The invention is illustrated by the following Examples. Although extrusion is particularly applicable to the invention it is not ideal for assessing adhesion levels accurately. Therefore an injection moulding technique was used.

EXAMPLE I

Sheets 228.6×76.2×2 mm of EPDM rubber compositions containing proportions of EPDM from 30 to 65% by volume as shown in Table I were vulcanized against a biaxially oriented polyethylene terephthalate (available under the Registered Trade Mark MELINEX) film to give a consistent, clean bonding surface.

Thermoplastic blends of various composition available under the trade name "Santoprene" from Monsanto were injected onto the EPDM rubber surface in a mould measuring 102×76.2×6 mm with a full-width fangate known to give even adhesion throughout the test sample. For comparison a polypropylene available as Carlona KM61 having a melt flow index of 3 was applied in the same manner. Part of the rubber sheet at the opposite end to the injection gate was sprayed with polytetrafluoroethylene (available under the registered Trade Mark TEFLON) to prevent adhesion. This injection moulding was carried out with a 45 ton lock Edgwick machine using the following moulding conditions:

Barrel temperature—275°/260°/250° C.
Mould temperature—70° C.
Cycle time—40 seconds Peel adhesion values of the resulting composites were measured at an Instron crosshead speed of 125 mm/minute and the results plotted on a graph (see FIG. 1).

Axis X denotes peel adhesion in N/cm and axis Y denotes rubber content of the EPDM as a percentage volume. Curve 1 refers to results obtained using Santoprene 73A. Curve 2 refers to results obtained using Santoprene 80A. Curve 3 refers to results obtained using Santoprene 87A. Curve 4 refers to results obtained using Santoprene 50D. Curve (5) (control) refers to results obtained using polypropylene—Carlona KM61.

The "Santoprene" formulations are believed to be dynamically cured polypropylene/EPDM/oil/filler thermoplastic elastomers. The polypropylene content is believed to be 87A>50D>80A>73A and the EPDM content is believed to be 87A>80A>73A>50D.

Adhesion values are dependent upon the type of failure which can vary considerably as follows:

⊙=Adhesion failure. Clean failure with no apparent change in the appearance of the rubber surface.

⊕=Thin layer plastic tearing. Failure occurs in the plastic layer which leaves a layer of plastic approximately 1 mm thick attached to to the rubber.

◐=Thin layer rubber tearing. Failure occurs in the rubber layer which leaves a thin layer of rubber approximately 0.5 mm thick attached to the plastic.

●=Rubber tearing. Failure occurs by massive rubber tearing, the value obtained being obviously dependent on the rubber tear strength and sample thickness.

TABLE I

| EPDM FORMULATIONS | (Parts by Weight) | | | | | |
|---|---|---|---|---|---|---|
| | A | B | C | D | E | F |
| Intolan 255(EPDM) | 100.0 | 100.0 | 100.0 | 100.0 | 100.0 | 100.0 |
| N550 carbon black | 56.0 | 77.0 | 106.0 | 127.0 | 153.0 | 187.0 |
| Circosol 4240 (naphthenic oil) | 26.0 | 47.0 | 76.0 | 97.0 | 123.0 | 157.0 |
| Stearic Acid | 1.0 | 1.0 | 1.0 | 1.0 | 1.0 | 1.0 |
| Zinc Oxide | 5.0 | 5.0 | 5.0 | 5.0 | 5.0 | 5.0 |
| Sulphur | 2.0 | 2.0 | 2.0 | 2.0 | 2.0 | 2.0 |
| ZnBuD(zinc dibutyl dithiocarbamate) | 2.0 | 2.0 | 2.0 | 2.0 | 2.0 | 2.0 |
| MBTS (mercaptobenz-thiazole disulphide) | 1.5 | 1.5 | 1.5 | 1.5 | 1.5 | 1.5 |
| TMTMS | 0.5 | 0.5 | 0.5 | 0.5 | 0.5 | 0.5 |

TABLE I-continued

| EPDM FORMULATIONS | (Parts by Weight) | | | | | |
|---|---|---|---|---|---|---|
| | A | B | C | D | E | F |
| (tetramethyl thiuram monosulphide) | | | | | | |
| Cure:- | 60 minutes at 150° C. | | | | | |
| B.S.D. Hardness | 71.0 | 73.0 | 68.5 | 70.5 | 70.5 | 71.0 |
| Rubber Volume % | 65 | 55 | 45 | 40 | 35 | 30 |

EXAMPLE II

Experiments have shown that an extrusion technique tends to give a better bond than an injection moulding technique:

| Thermoplastic blend | EPDM Content of vulcanized rubber Composition % volume | Injection Moulding Adhesion N/cm | Extrusion Adhesion N/cm |
|---|---|---|---|
| Santoprene 73A | 33 | 22(E)PF | 50RT |
| Santoprene 73A | 35 | 19AF | 39AF |
| Santoprene 73A | 43 | 4(E)AF | 15AF |
| Santoprene 50D | 35 | 60RT | 56RT |
| Santoprene 50D | 43 | 52(E)RT | 68RT |

E = estimated from FIG. 1
PF = plastic failure
AF = adhesion failure
RT = rubber tearing

EXAMPLE III

Sheets 228.6×76.2×2 mm of EPDM rubber compositions containing proportions of EPDM from 30 to 65% by volume as shown in Table I were vulcanized against Melinex (a biaxially oriented polyethylene terephthalate) film to give a consistent clean bonding surface.

A dynamically cured thermoplastic elastomeric blend of high density polyethylene (HDPE) and vulcanized EPDM was prepared by mixing the following ingredients in a 34 mm twin screw extruder at a temperature of 200° C. and screw speed of 233 rpm:

| | |
|---|---|
| Epcar 585 (EPDM) | 100.0 parts by weight |
| Rigidex 006/60 (HDPE) | 130.0 parts by weight |
| Sunpar 2280 (paraffinic oil) | 145.0 parts by weight |
| Schenectady SP 1055 (Brominated phenolic resin) | 12.0 parts by weight |
| Zinc Oxide | 5.0 parts by weight |
| Titanium Dioxide | 5.0 parts by weight |
| Stearic Acid | 1.0 parts by weight |
| Mistron Vapour Talc | 1.0 parts by weight |

Figure 2:
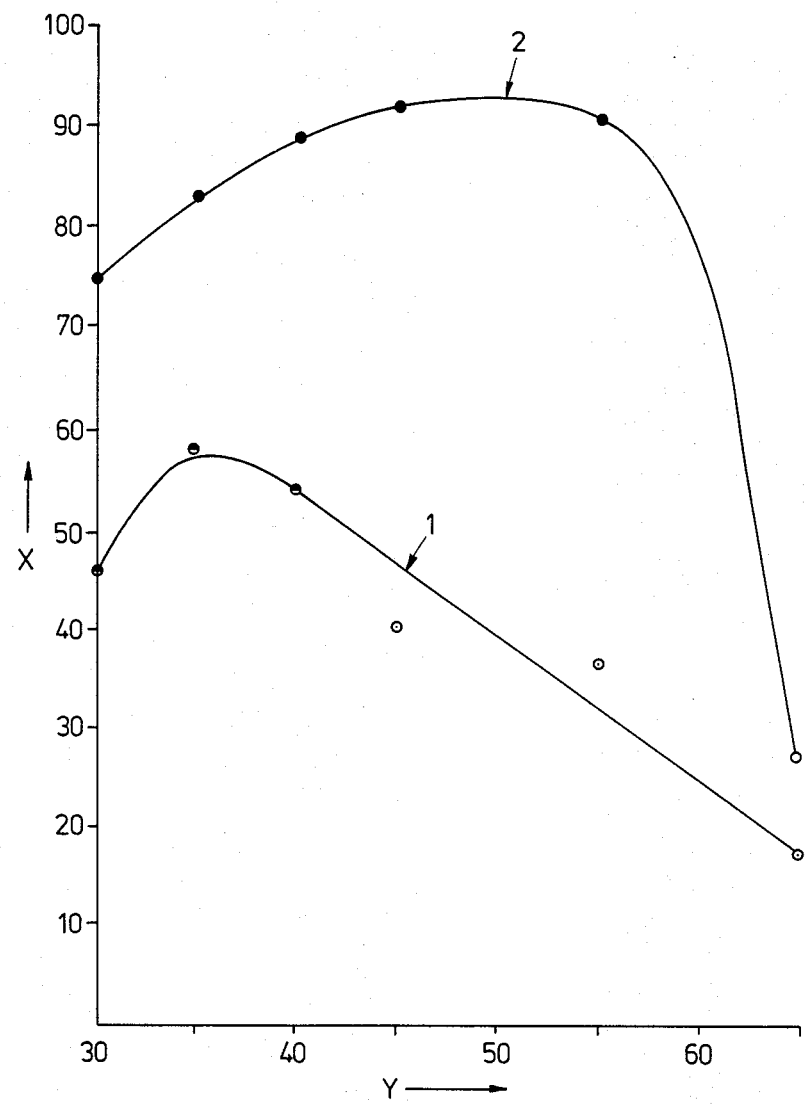

The thermoplastic blend was injected onto the EPDM rubber surface in a mould measuring 102×76.2×6 mm with a full width fangate known to give even adhesion throughout the test sample. For comparison the HDPE Rigidex 006/60 having a melt flow index of 0.6 was applied in the same manner. Part of the rubber sheet at the opposite end to the injection gate was sprayed with Teflon (polytetrafluoroethylene) to prevent adhesion. The injection moulding was carried out with a 45 ton lock Edgwick machine using the following moulding conditions:

Barrel temperature—275°/260°/250° C.
Mould temperature—70° C.
Cycle time—40 seconds Peel adhesion values of the resulting composites were measured at an Instron crosshead speed of 125 mm/minute and the results plotted on a graph (see FIG. 2). Axis X denotes peel adhesion in N/cm and axis Y denotes rubber content of the EPDM as a percentage volume. Curve 1 refers to results obtained using the HDPE/EPDM blend and curve 2 (control) refers to results obtained using the HDPE. The symbols used for the graph points have the same meaning as described in Example I.

I claim:

1. A bonded composite of
   (i) a thermoplastic elastomeric blend of vulcanized ethylene/propylene/diene monomer terpolymer rubber particles not more than 50 microns in size dispersed in a thermoplastic linear crystalline polyolefin continuous phase, with
   (ii) a vulcanized ethylene/propylene/diene monomer terpolymer or ethylene/propylene copolymer rubber composition containing less than 50% by volume of rubber, made by a method which comprises fusing the thermoplastic elastomeric blend and solidifying it in contact with the vulcanized rubber composition in the absence of an adhesive interlayer.

2. A bonded thermoplastic elastomer blend/vulcanized ethylene/propylene/diene monomer terpolymer or ethylene/propylene copolymer rubber composite which comprises:
   (i) a thermoplastic elastomer which has vulcanized ethylene/propylene/diene monomer rubber particles not more than 50 microns in size dispersed in a thermoplastic linear crystalline polyolefin continuous phase, bonded without an adhesive interlayer to
   (ii) a vulcanized ethylene/propylene/diene monomer terpolymer or ethylene/propylene copolymer rubber containing less than 50% by volume of rubber.

* * * * *